D. E. CLOUD.
TOPPER ATTACHMENT FOR CORN HARVESTERS OR BINDERS.
APPLICATION FILED MAY 20, 1912.
1,053,278.
Patented Feb. 18, 1913.
2 SHEETS—SHEET 1.
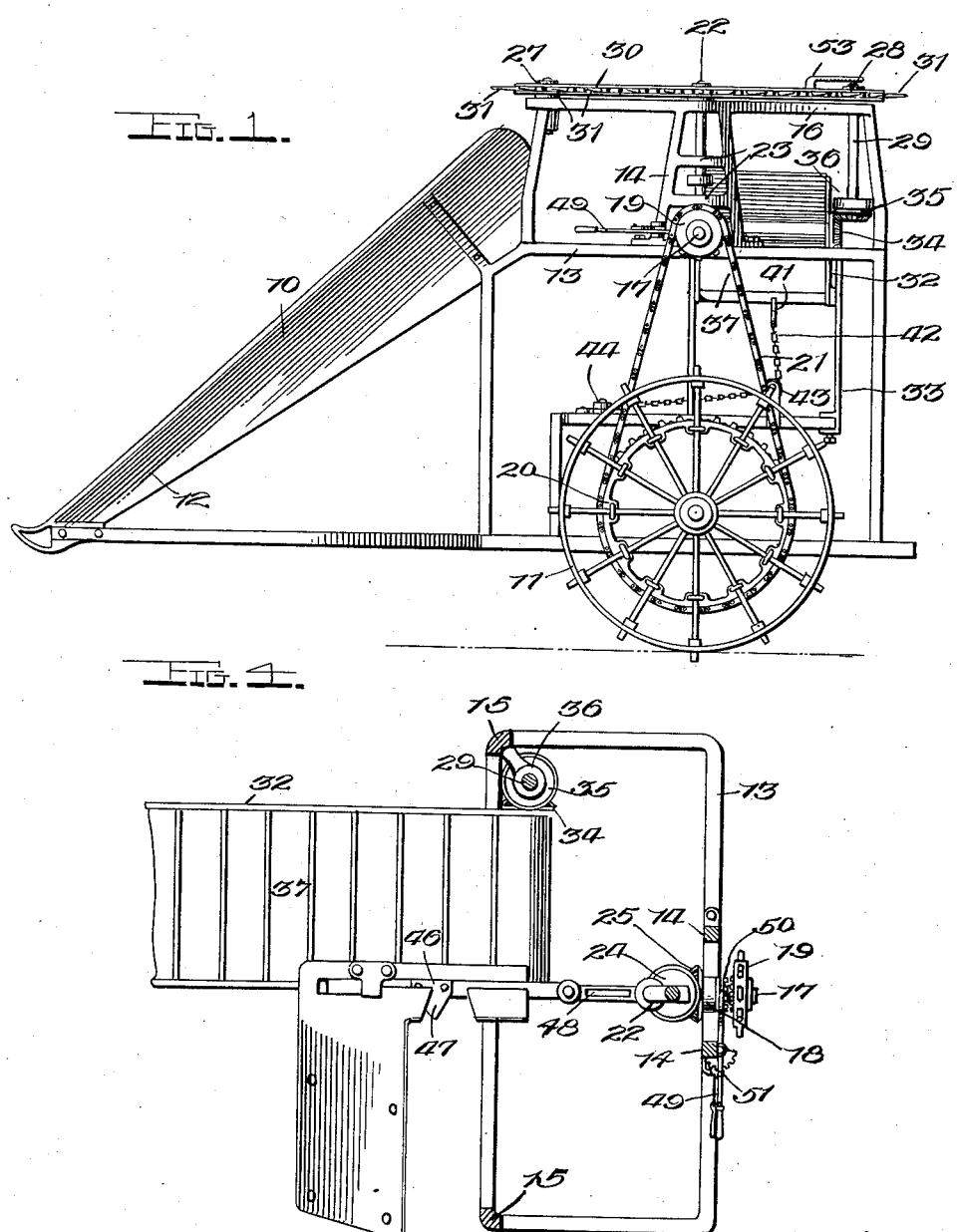
Witnesses
Chas. L. Grieshauer.
A. B. Norton.
Inventor
D. E. Cloud
By Watson E. Coleman,
Attorney

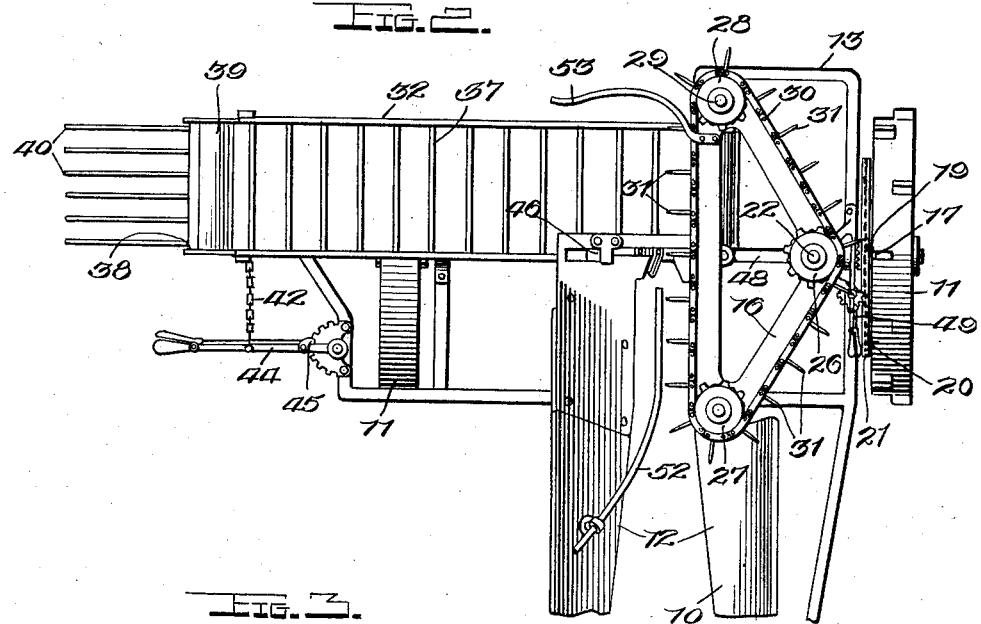

UNITED STATES PATENT OFFICE.

DON E. CLOUD, OF INAVALE, NEBRASKA.

TOPPER ATTACHMENT FOR CORN HARVESTERS OR BINDERS.

1,053,278.  Specification of Letters Patent.  Patented Feb. 18, 1913.

Application filed May 20, 1912. Serial No. 698,540.

*To all whom it may concern:*

Be it known that I, DON E. CLOUD, a citizen of the United States, residing at Inavale, in the county of Webster and State of Nebraska, have invented certain new and useful Improvements in Topper Attachments for Corn Harvesters or Binders, of which the following is a specification, reference being had to the accompanying drawings.

The present invention relates to a topper attachment to be used in connection with a corn harvester or binder which will sever the tops of the corn from the stalk thereof and deliver the same to one side of the harvester so that the binder may follow and gather the stalks in the usual way.

The object of the present invention is to construct a frame provided with the attachment of this character which may be easily and readily attached to or detached from the binder and perform all the functions of the corn toppers which are now in use.

Other objects will appear hereinafter as the description continues.

With the above and other objects in view this invention consists of novel details of construction, combination, formation and arrangements of parts as will be hereinafter more fully and specifically described, claimed and particularly pointed out in the appended drawings in which, Figure 1 is a side elevation of my improved topper as applied to the forward end of a binder or harvesting machine; Fig. 2 is a plan view of the topper with the binder removed; Fig. 3 is a sectional view of the same; and Fig. 4 is a detail longitudinally extending section taken through the topper frame.

Like parts will be illustrated by like numerals throughout the several views forming part of the present specification.

The numeral 10 indicates a forward end portion of an ordinary corn binder being supported upon traction wheels 11 and provided at its forward extremity with a pair of dividers 12 which travel in the path of the rows of corn and direct the same to the binder.

Mounted upon the forward end of a corn binder as described is a supplemental frame 13 which supports my improved topper. This supplemental frame 13 is provided adjacent one edge thereof with a substantially V-shaped support 14 and its opposite edge is provided with a pair of vertically extending supports 15, the upper extremities of these supports are connected by a substantially triangular shaped frame 16 the purpose of which will be hereinafter described. A shaft 17 is journaled within a suitable bearing 18 on the outer side of the support and has keyed to one extremity thereof a sprocket wheel 19 which is connected to a larger sprocket wheel 20 secured to the traction wheel 11 by means of an endless chain 21 thereby providing suitable means for operating the topper.

A vertically extending crank shaft 22 is journaled within suitable bearing boxes 23 formed in the frames 14 and 16 respectively and its lower extremity has keyed thereto a beveled gear 24 which meshes with a similar gear 25 mounted on the inner extremity of the shaft 17. Journaled within each apex of the triangular frame 16 are sprocket wheels one of which indicated by the numeral 26 is secured to the upper end of the crank shaft 22, the sprocket wheel 27 being loosely mounted upon the frame and the sprocket wheel 28 being mounted on the upper extremity of the vertically extending shaft 29 for operating the endless conveyer. An endless chain 30 extends around each of these sprocket wheels and is provided with fingers 31 which engage the tops of the corn and carry the same to the cutter in the usual manner.

A conveyer frame 32 is supported upon the inner end of the supplemental frame 13 at one end thereof and its opposite end is supported by braces 33 which are secured to the opposite side of the harvester. One end of the inner roller mounted within the conveyer frame is provided with a beveled gear 34 adapted to mesh with the crown gear 35 mounted on the lower extremity of the shaft 29. The lower extremity of the shaft is braced by a suitable bearing 36 mounted upon the frame 13. An endless conveyer 37 is mounted on this conveyer frame in any well known manner and is adapted to carry the tops of the corn after they have been severed by the cutting blades from the stalks to the opposite side of the harvester and they are then emptied into a carrier. This carrier consists of an inclined chute 39 which is secured at its upper end to the outer extremity of the conveyer frame and has hingedly secured, as at 38, a rack 40 which is adapted to be controlled by the operator for dumping the tops of the corn upon the ground which are later collected by a rake in the usual manner. To provide means for operating the said rack an arm 41 extends from the center thereof and is connected to a chain 42 which extends under a guide roller 43 mounted upon the frame of the harvester and is provided at its opposite end with a lever 44 which is pivotally mounted upon the frame of the harvester whereby operating the said lever the rack may be raised and lowered as desired. A spring actuated pawl 45 is mounted upon the said lever 44 whereby the same may be held at various positions so as to hold the rack in a raised or lowered position as desired.

Extending parallel with the conveyer frame and secured to the supplemental frame is a suitable sickle 46 provided with the usual bearing plates which have mounted therein a reciprocating cutter blade 47, the inner end of the said cutter blade being connected to the crank shaft 22 by means of a pitman 48 whereby the rotation of the said crank shaft will reciprocate the said cutter blade through the instrumentality of the pitman.

To provide means for controlling the operation of the topper I have provided a lever 49 which is pivotally secured to the supplemental frame 13 and is connected to a clutch member 50 of the construction shown mounted on the shaft 17 whereby throwing this clutch member in and out of gear the operation of the topper will be controlled. A spring actuated pawl 51 is on the lever 49 for engaging the segmental rack so that the clutch 50 will be held in or out of gear as desired. It is obvious from this construction that as the dividers travel in the path of the rows of corn the same will be directed to the binder and before the stalks of the corn have engaged the binder the fingers 31 carry the tops of the corn to the sickle 46 which will cut the tops off and upon further operation the fingers will carry the tops on to the endless conveyer which will carry the same to the rack 40. A guide 52 is secured upon the frame and is flared at its outer end to receive the tops of the corn and as the binder travels over the field, this guide rod will direct the tops to the fingers formed on the endless chain which will in turn direct the same to the sickle. After the tops have been severed from the stalks by the sickle the same are caught by a curved arm 53 mounted on the triangular frame 16 and adjacent one end thereof which catches the tops of the corn and holds the same upon the conveyer which in turn carries the same as before described to the opposite side of the harvester. It is obvious from this construction that I have provided a supplemental frame with the usual topper which can be applied to any or all makes of corn harvesting machines and which can be used for topping cane, broom corn, Kafir corn, etc.

Whereas I have shown a specific embodiment of the present invention it is to be understood that other minor details of construction and operation may be resorted to that come within the scope of the present invention without departing from the spirit thereof.

What I claim is:—

1. In a topper, the combination of a frame, of a supplemental triangular frame mounted thereupon, sprocket wheels mounted in each of the apexes formed by said triangular frame, a sprocket chain extending around said sprocket wheels, fingers extending from said chain, a vertically extending crank shaft journaled within said frame and said supplemental frame, one of the said sprocket wheels being mounted upon said crank shaft, a vertically extending shaft mounted in said frame, one of the said sprocket wheels being mounted thereupon, a sickle mounted upon one end of the said frame, a pitman connecting said sickle with said crank shaft, an endless conveyer extending laterally from said supplemental frame, means operatively connecting said endless conveyer with the said vertically extending shaft, a carrier mounted at the outer extremity of said conveyer, a rack hingedly secured to said carrier and means for operating said rack substantially as described.

2. The combination with a harvester, of a supplemental frame mounted thereupon, a pair of vertical uprights mounted at the ends of said supplemental frame, a V-shaped frame mounted on one side of said supplemental frame in the medial portion thereof, a triangular frame mounted upon said supports, a conveyer mechanism mounted upon said triangular frame, an endless conveyer extending laterally from said supplemental frame and mounted thereupon, a sickle mounted upon said supplemental frame in front of said endless conveyer and extending parallel therewith, a curved arm extending laterally from said triangular frame above said endless conveyer and adjacent the rear thereof, and means for operating said conveyer mechanism and sickle, substantially as described.

In testimony whereof I hereunto affix my signature in the presence of two witnesses.

DON E. CLOUD.

Witnesses:
J. W. AULD,
IONE ALBRIGHT.